Figure 1:
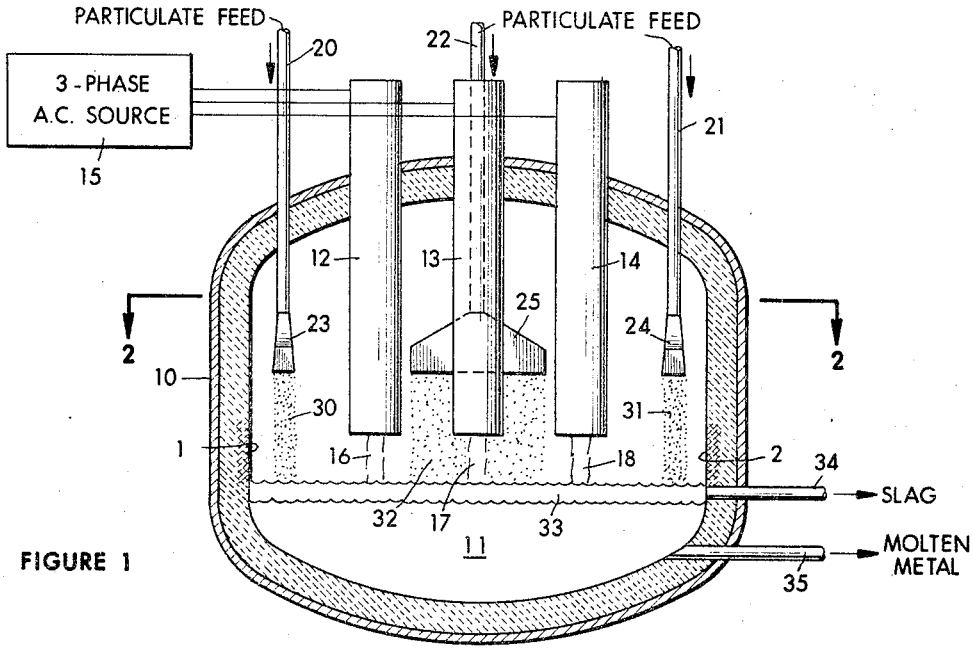
Figure 2:
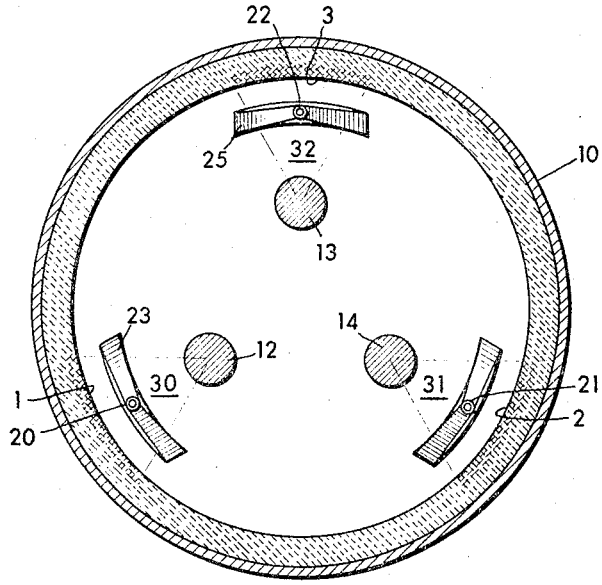

T 859,001

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED FEBRUARY 4, 1969

859 O.G. 41

613,819
ELECTRIC ARC FURNACE OPERATIONS
Joseph J. Kociscin, 42 N. 22nd St., Kenilworth, N.J. 07033
Filed Feb. 3, 1967. Published Feb. 4, 1969
Class 75—12
1 Sheet Drawing. 9 Pages Specification

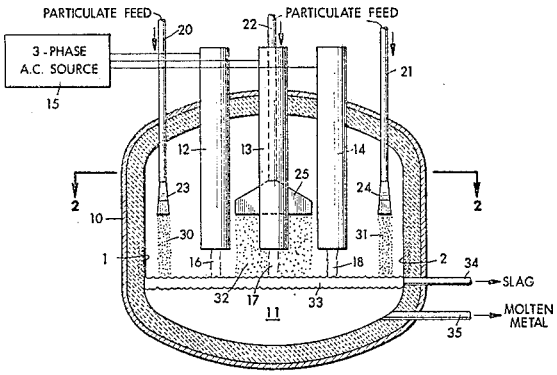

A technique is described for preventing excessive erosion of the walls of an electric arc steelmaking furnace. The erosion is prevented by shielding the portion of the walls closest to the electrodes from the intense radiation created by the electric arcs. The shielding is provided by continuously adding powdered partially-reduced iron ore to the furnace between the walls of the furnace and the arcs.

T859,001

DEF. PUB. #613819

J. J. KOCISCIN INVENTOR